(12) United States Patent
Masuda et al.

(10) Patent No.: US 9,623,402 B2
(45) Date of Patent: Apr. 18, 2017

(54) DENITRATION CATALYST AND METHOD FOR PRODUCING SAME

(71) Applicant: MITSUBISHI HITACHI POWER SYSTEMS, LTD., Kanagawa (JP)

(72) Inventors: Tomotsugu Masuda, Tokyo (JP); Katsumi Nochi, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/786,184

(22) PCT Filed: Apr. 17, 2014

(86) PCT No.: PCT/JP2014/060945
§ 371 (c)(1),
(2) Date: Oct. 22, 2015

(87) PCT Pub. No.: WO2014/178290
PCT Pub. Date: Nov. 6, 2014

(65) Prior Publication Data
US 2016/0067683 A1 Mar. 10, 2016

(30) Foreign Application Priority Data
Apr. 30, 2013 (JP) .................. 2013-095400

(51) Int. Cl.
*B01J 37/12* (2006.01)
*B01J 37/14* (2006.01)
(Continued)

(52) U.S. Cl.
CPC ........ *B01J 27/053* (2013.01); *B01D 53/8628* (2013.01); *B01J 21/063* (2013.01);
(Continued)

(58) Field of Classification Search
CPC ........ B01J 21/063; B01J 23/22; B01J 27/053; B01J 35/0006; B01J 35/0014;
(Continued)

(56) References Cited

U.S. PATENT DOCUMENTS 4,048,112 A * 9/1977 Matsushita ........ B01D 53/8628
423/213.2
4,466,947 A 8/1984 Imanari et al.
(Continued)

FOREIGN PATENT DOCUMENTS

JP 57-14211 3/1982
JP 57-26820 6/1982
(Continued)

OTHER PUBLICATIONS

International Search Report issued Jul. 22, 2014 in International Application No. PCT/JP2014/060945.
(Continued)

*Primary Examiner* — Patricia L Hailey
(74) *Attorney, Agent, or Firm* — Wenderoth, Lind & Ponack, L.L.P.

(57) ABSTRACT

Provided is a denitration catalyst with an improved wear resistance capable of stably reducing and removing nitrogen oxides in flue gases for a long period of time and a production method therefor. A denitration catalyst obtained by having a honey comb molded body that contains at least titanium oxide and vanadium pentoxide support magnesium surface, and wherein the peak intensity ratio of the first peak of the magnesium sulfate to the first peak of the titanium oxide in X-ray diffraction is 0.05-0.15, the content of the magnesium sulfate increases by 6-22% by mass, the pore volume is 0.17-0.40 cc/g, and the specific surface area is 33-100 $m^2/g$.

4 Claims, 6 Drawing Sheets

(51) Int. Cl.
| | |
|---|---|
| B01J 27/053 | (2006.01) |
| B01D 53/86 | (2006.01) |
| B01J 37/02 | (2006.01) |
| B01J 21/06 | (2006.01) |
| B01J 23/22 | (2006.01) |
| B01J 35/10 | (2006.01) |
| B01J 35/04 | (2006.01) |
| B01J 37/08 | (2006.01) |

(52) U.S. Cl.
CPC .............. *B01J 23/22* (2013.01); *B01J 35/04* (2013.01); *B01J 35/1014* (2013.01); *B01J 35/1038* (2013.01); *B01J 37/02* (2013.01); *B01J 37/0242* (2013.01); *B01J 37/08* (2013.01); *B01D 2255/2047* (2013.01); *B01D 2255/20707* (2013.01); *B01D 2255/20723* (2013.01); *B01D 2255/9207* (2013.01); *B01D 2258/0283* (2013.01)

(58) Field of Classification Search
CPC  B01J 35/1038; B01J 37/0201; B01J 37/0213; B01J 37/08; B01J 37/12; B01J 37/14; B01J 2523/47; B01J 2523/55; B01J 2523/22; B01D 2255/2047; B01D 2255/20707; B01D 2225/20723
USPC .......... 502/217, 312, 350; 423/213.2, 239.1; 428/116, 403
See application file for complete search history.

(56) References Cited

U.S. PATENT DOCUMENTS

| | | | |
|---|---|---|---|
| 4,865,827 A | | 9/1989 | Tachi et al. |
| 5,512,259 A | | 4/1996 | Hagenmaier et al. |
| 6,120,747 A | | 9/2000 | Sugishima et al. |
| 8,465,713 B2 * | 6/2013 | Schermanz | B01D 53/9418 423/239.1 |
| 8,673,250 B2 * | 3/2014 | Kai | B01D 53/8628 423/239.1 |
| 2008/0220966 A1 * | 9/2008 | Obayashi | B01D 53/8628 502/27 |

FOREIGN PATENT DOCUMENTS

| | | |
|---|---|---|
| JP | 63-48584 | 9/1988 |
| JP | 63-291628 | 11/1988 |
| JP | 1-317545 | 12/1989 |
| JP | 3-68415 | 3/1991 |
| JP | 4-503772 | 7/1992 |
| JP | 2707330 | 1/1998 |
| JP | 10-235191 | 9/1998 |
| JP | 2001-269576 | 10/2001 |
| JP | 2002-136873 | 5/2002 |
| JP | 2002-159862 | 6/2002 |
| JP | 2006-320803 | 11/2006 |
| JP | 2012-139625 | 7/2012 |

OTHER PUBLICATIONS

International Preliminary Report on Patentability issued Nov. 3, 2015 in International Application No. PCT/JP2014/060945.
Extended European Search Report issued Jun. 10, 2016 in European patent application No. 14792329.6.
Database WPI—Week 199006; Thomson Scientific, London, GB; AN 1990-040740 & JP H01 317545 A (Babcock-Hitachi KK) Dec. 22, 1989 (Dec. 22, 1989).
English translation of JP 2012-139625.
English translation of JP 2001-269576.
English translation of JP 2002-159862.
Database WPI—Week 199134; Thomson Scientific, London, GB; AN 1991-248023 & JP H03 68415 A (Seibu Geken KK) Mar. 25, 1991 (Mar. 25, 1991) & JP 2 707330 B2 (Seibu Giken Co., Ltd.) Jan. 28, 1998 (Jan. 28, 1998).
Concise Explanation of Relevant for Non-English Language reference JP H01-317545 previously cited in an IDS filed on Jan. 21, 2016.
Concise Explanation of Relevant for Non-English Language reference JP S57-14211 previously cited in an IDS filed on Jan. 21, 2016.
Concise Explanation of Relevant for Non-English Language reference JP S57-26820 previously cited in an IDS filed on Jan. 21, 2016.

* cited by examiner

DENITRATION CATALYST AND METHOD FOR PRODUCING SAME

TECHNICAL FIELD

The present invention relates to a denitration catalyst for the reduction and removal of nitrogen oxides included in a flue gas by using a reductant, and more specifically relates to a denitration catalyst having resistance to wear that may occur due to dust included in a flue gas, and relates to a production method therefor.

BACKGROUND ART

Various types of so-called denitration catalysts and denitration methods, which reduce and remove nitrogen oxides in flue gases by causing the nitrogen oxides to contact a reductant such as ammonia in the presence of a catalyst, are known. Among such denitration catalysts, a honeycomb-shaped catalyst (honeycomb catalyst) constitutes a fixed bed of a catalyst reactor having through holes arranged in the direction of flow of the flue gas, and thus, if a honeycomb catalyst is used, less pressure loss by gas flow would occur, and as a result, the linear speed of the flue gas can be controlled to be higher compared with that in a catalyst reactor in which a fixed bed catalyst having a shape other than the honeycomb shape is charged. Further, when a honeycomb catalyst is used, if the flue gas includes dust, the through holes are less likely to be clog by the dust, and thus, gas catalytic reactions can be efficiently run. With the above-described advantages, honeycomb catalysts have been widely used for denitration reactions of combustion flue gases including nitrogen oxides that are generated from boilers and the like.

However, even if a honeycomb catalyst is used, if the honeycomb catalyst is used for treating a flue gas including extremely hard dust particles such as of calcium, magnesium, silica, alumina, iron, and the like, the dust particles may collide with one another, and the honeycomb catalyst may be gradually worn by the collisions of the dust particles, and thus, the honeycomb catalyst may finally lose its shape and may not withstand further use in some cases.

In order to prevent a honeycomb catalyst from wear, a method in which the strength of a honeycomb catalyst is increased by firing the front end thereof including an inlet for flue gas, and a method in which a honeycomb catalyst is strengthened by covering the surface thereof with a glass substance and thereby the wear resistance is increased have been proposed (e.g., Patent Literatures 1 to 3). Wear on the front end of a honeycomb catalyst occurring due to dust particles can be alleviated by strengthening the front end.

However, a flue gas emitted from a coal-fired boiler may include a large amount of high-hardness dust particles, depending on the type of the coal used in the boiler. If a large amount of dust particles is present, even if a honeycomb catalyst with a strengthened front end is used, the honeycomb catalyst may be locally worn in portions different from the front end.

In addition, if a denitration apparatus is to be additionally installed in a plant, the catalyst may not be allowed to have a sufficiently large section due to the limited installation area for the facilities. Accordingly, if a method in which a combustion flue gas is treated at a high flow rate such as flue denitration is used, the honeycomb catalyst may be more considerably worn.

CITATION LIST

Patent Literature

[PLT 1] JP S57-14211 B
[PLT 2] JP S57-26820 B
[PLT 3] U.S. Pat. No. 4,294,806 B

SUMMARY OF INVENTION

Technical Problem

In consideration of the above problems, an object of the present invention is to provide a denitration catalyst with high wear resistance and capable of reducing and removing nitrogen oxides included in a flue gas stably for over a long period of time, and an object is to provide a production method therefor.

Solution to Problem

In order to solve the above-described problems, the inventors have made various investigations to improve the wear resistance of a denitration catalyst. As a result, it has been found that the wear resistance of a denitration catalyst can be improved by carrying a specific amount of crystallized magnesium sulfate on a honeycomb molded body including titanium oxide and vanadium pentoxide, and the present invention has been completed based on this finding.

More specifically, according to a first aspect of the present invention, a denitration catalyst in which magnesium sulfate is carried on a honeycomb molded body which at least includes titanium oxide and vanadium pentoxide is treated so that a peak strength ratio between a first peak for the titanium oxide and a first peak for the magnesium sulfate observed by an X-ray diffraction method is 0.06 to 0.15 and that a content of the magnesium sulfate is increased by 6% by mass to 22% by mass.

According to a second aspect of the present invention, a method of producing a denitration catalyst includes a magnesium sulfate carrying step of carrying magnesium sulfate increased by 6% by mass to 22% by mass on the honeycomb molded body by immersing a honeycomb molded body which at least includes titanium oxide and vanadium pentoxide in a 30° C. to 70° C. aqueous solution of magnesium sulfate; and a firing step of firing the honeycomb molded body at 510° C. to 550° C., which is performed after the magnesium sulfate carrying step.

According to a third aspect of the present invention, a method of producing a denitration catalyst at least includes a carrying step of carrying magnesium sulfate increased by 6% by mass to 22% by mass and 0.3% by mass to 1% by mass of vanadium sulfate on a honeycomb molded body which at least includes titanium oxide and vanadium pentoxide by immersing the honeycomb molded body in a 30° C. to 70° C. mixed solution of an aqueous solution of magnesium sulfate and an aqueous solution of vanadium sulfate; and a firing step of firing the honeycomb molded body at 510° C. to 550° C., which is performed after the carrying step.

Advantageous Effects of Invention

According to the present invention, the wear resistance of a denitration catalyst can be improved, and nitrogen oxides included in flue gases can be reduced and removed stably for a long period of time.

DESCRIPTION OF EMBODIMENTS

Typical embodiments of the present invention will be described in detail below.

To begin with, a denitration catalyst according to the present invention is a catalyst in which magnesium sulfate is carried on a honeycomb molded body which at least includes titanium oxide and vanadium pentoxide. The shape of the honeycomb molded body is not limited to a specific shape, and examples of the honeycomb molded body include ones with the shape of a polygonal column, i.e., ones in which the honeycomb surface has the shape of polygons such as tetragon, pentagon, and hexagon; and ones with a columnar shape in which the honeycomb surface has a circular shape. If a honeycomb-shaped molded body is used as the denitration catalyst, the honeycomb denitration catalyst constitutes the fixed bed of a catalyst reactor having through holes arranged in the direction of flow of a flue gas, and thus less pressure loss by gas flow may occur, and as a result, the linear speed of the flue gas can be controlled to be higher compared with that of denitration catalysts having a shape other than the honeycomb shape, such as granular, annular, and cylindrical shape. Further, if a honeycomb-shaped catalyst is used, less clogging of the through holes may occur due to dust particles in the flue gas, and gas catalytic reactions can be efficiently run.

Titanium oxides are capable of imparting a practicable strength to the honeycomb molded body, and anatase type titanium oxide can be particularly used. Vanadium pentoxide is an active ingredient which promotes denitration reactions.

In addition to titanium oxide and vanadium pentoxide, the honeycomb molded body can include tungsten trioxide, silica, and the like for better promotion of denitration reactions and for improving molding properties of the honeycomb molded body. If tungsten trioxide and silica are to be included, they can be included in the honeycomb molded body in the form of a composite oxide of titanium oxide and tungsten trioxide and a composite oxide of titanium oxide and silica.

By carrying a specific amount of magnesium sulfate on the honeycomb molded body, resistance to wear occurring due to high-hardness dust particles in the flue gas can be imparted to the denitration catalyst without degrading the catalyst activity of the denitration catalyst.

In the denitration catalyst of the present invention, a peak strength ratio between the first peak for titanium oxide and the first peak for magnesium sulfate obtained by X-ray diffraction is 0.06 to 0.15. The crystal structure of the denitration catalyst is measured by the X-ray diffraction method, and in this measurement, a peak that is the strongest among peaks originating from titanium oxide included in the honeycomb molded body is used as the first peak for titanium oxide, and a peak that is the strongest among peaks originating from magnesium sulfate carried on the honeycomb molded body is used as the first peak for magnesium sulfate. If magnesium sulfate has been highly crystallized, resistance to wear occurring due to high-hardness dust particles in a flue gas can be imparted by the crystal of magnesium sulfate to the denitration catalyst so that magnesium sulfate may be carried on the honeycomb molded body as a crystal and the peak strength ratio between the first peak for titanium oxide and the first peak for magnesium sulfate may be controlled within a range of 0.06 to 0.15.

The denitration catalyst of the present invention is a denitration catalyst prepared by performing a treatment for increasing the content of magnesium sulfate by 6% by mass to 22% by mass. The increase by 6% by mass to 22% by mass is equivalent to charging of 6 g to 22 g of magnesium sulfate to 100 g of the catalyst. For example, if the content of magnesium sulfate has been increased by 6% by mass to 22% by mass, then 100 g of the denitration catalyst contains 6 g to 22 g of magnesium sulfate. The denitration catalyst includes 6% by mass to 22% by mass of highly crystallized magnesium sulfate with which the peak strength ratio between the first peak for titanium oxide and the first peak for magnesium sulfate within a range of 0.06 to 0.15, and thereby the denitration catalyst can be provided with the resistance to wear occurring due to high-hardness dust particles in the flue gas.

In the denitration catalyst of the present invention, the pore volume is 0.17 cc/g to 0.40 cc/g. When highly crystallized magnesium sulfate is carried, if the pore volume is small, the denitration activity becomes low, whereas if the pore volume is large, the mechanical strength as a denitration catalyst is low. By controlling the pore volume within a range of 0.17 cc/g to 0.40 cc/g, sufficiently high denitration activity and mechanical strength can be obtained. The pore volume can be measured by mercury porosimetry, for example.

In the denitration catalyst of the present invention, the specific surface area is 33 m$^2$/g to 100 m$^2$/g. When highly crystallized magnesium sulfate is carried, if the specific surface area is small, the denitration activity is low, whereas if the specific surface area is large, the mechanical strength as a denitration catalyst is low. By controlling the specific surface area within a range of 33 m$^2$/g to 100 m$^2$/g, sufficient denitration activity and mechanical strength can be obtained. The specific surface area can be measured by the Brunauer-Emmett-Teller (BET) method, for example.

It is preferable, in the denitration catalyst of the present invention, if the content of magnesium at portions close to the surface of the denitration catalyst measured by the electron probe micro analysis (EPMA) measurement be higher than the content of magnesium present in the center of the catalyst. EPMA is an electron microprobe device for analyzing constituent elements based on the wavelength and the intensity of characteristic X-rays emitted by irradiation on an analysis target substance with electromagnetic rays. The content of magnesium in the portions close to the surface of the denitration catalyst can be measured and the distribution of magnesium sulfate can be determined by performing the EPMA measurement. In the denitration catalyst, the portions on the denitration catalyst close to the surface thereof are constituted by walls arranged inside the catalyst that form through holes formed in the direction of flow of the flue gas, which have a depth of 200 μm from the surface of the wall on which the wall contacts the flue gas toward the inside of the wall. The center of the catalyst is a portion with a width of ±100 μm from the center of the inside of the wall of the denitration catalyst. The content of magnesium contained in the portion with the 200 μm-thick portion, i.e., in the portion corresponding to the depth of 200 μm from the surface of the denitration catalyst to the center of the inside of the catalyst, is higher than the content of magnesium contained in the center of the catalyst, and thereby, more resistance to the wear occurring due to high-hardness dust particles in the flue gas can be imparted to the denitration catalyst.

It is preferable, in the denitration catalyst of the present invention, that the content of sulfur in the portions close to the surface of the denitration catalyst measured by the EPMA measurement be higher than the content of sulfur in the center of the catalyst. The content of sulfur in the portions close to the surface of the denitration catalyst can be measured and the distribution of sulfur can be determined by performing the EPMA measurement. The content of sulfur in the portions close to the surface of the denitration catalyst is higher than the content of sulfur in the center of the catalyst, and thereby, more resistance to wear occurring due to high-hardness dust particles in the flue gas can be imparted to the denitration catalyst.

Next, a denitration catalyst production method of the present invention will be described. The denitration catalyst production method of the present invention at least includes a magnesium sulfate carrying process and a firing process. The magnesium sulfate carrying process is a process of carrying magnesium sulfate on the honeycomb molded body by immersion of the honeycomb molded body into an aqueous solution of magnesium sulfate.

The shape of the honeycomb molded body is not limited to a specific shape, and examples of the honeycomb molded body include ones with the shape of a polygonal column, i.e., ones in which the honeycomb surface has the shape of polygons such as a tetragon, pentagon, and hexagon; and ones with a columnar shape in which the honeycomb surface has a circular shape. In producing such a honeycomb molded body, the following method is generally used, in which a ceramic is used as the main raw material, water, additives, and the like are added to the raw material ceramic first, then the mixture is kneaded into the raw material to produce a homogeneous body, then the body is shaped by extrusion molding or the like into a honeycomb shape, and then the honeycomb-shaped body is dried and fired.

In the denitration catalyst production method of the present invention, a honeycomb molded body which at least includes titanium oxide and vanadium pentoxide is used. Titanium oxide can be used as the main raw material of the honeycomb molded body. For the raw material of the titanium oxide, previously prepared titanium oxide can be used, and titanium compounds such as titanic acid, titanium hydroxide, and titanium sulfate can also be used. Vanadium pentoxide is an active ingredient which promotes denitration reactions. For the raw material of the vanadium pentoxide, vanadium pentoxide per se can be used, and ammonium metavanadate can also be used.

In the denitration catalyst production method of the present invention, the temperature of the aqueous solution of magnesium sulfate for immersing the honeycomb molded body is 30° C. to 70° C. By controlling the temperature within this range, magnesium sulfate can be readily impregnated into the honeycomb molded body, and the magnesium sulfate can be efficiently carried on the honeycomb molded body. Even if the concentration of the aqueous solution of magnesium sulfate used for the immersion is low, 6% by mass to 22% by mass of magnesium sulfate can be carried on the honeycomb molded body by repeating the immersion of the honeycomb molded body and drying of the immersed honeycomb molded body. However, if an aqueous solution of magnesium sulfate in which the concentration of magnesium sulfate is 15% by mass to 36% by mass is used, then 6% by mass to 22% by mass of magnesium sulfate can be carried on the honeycomb molded body by immersing the honeycomb molded body into the aqueous solution of magnesium sulfate once. To control the concentration of magnesium sulfate within the above-described range, it is preferable if the temperature of the aqueous solution of magnesium sulfate be 30° C. to 70° C., considering the solubility is water.

In the denitration catalyst production method of the present invention, the drying process is a process of drying the honeycomb molded body after the magnesium sulfate carrying process. The drying process is carried out to remove excess moisture content from the honeycomb molded body after it is immersed into the aqueous solution of magnesium sulfate and also to prevent transition of the carried magnesium sulfate in the honeycomb molded body and fix it in the honeycomb molded body. For a method of the drying, air drying, hot air drying, and the like can be used alone or in combination. To consider the production efficiency, the moisture content may be sufficiently reduced by air drying, and then the honeycomb molded body may be further dried by a drying process which uses hot air of 100° C. to 120° C. The drying process is usually a process which takes 1 hour to 5 hours.

In the denitration catalyst production method of the present invention, the firing process is a process of firing the honeycomb molded body after the drying process. The firing process is carried out to crystallize the magnesium sulfate carried on the honeycomb molded body by applying heat. For a method of the firing, it is preferable that the honeycomb molded body be fired in an electric kiln or the like at 510° C. to 550° C. for about 3 hours. If the firing temperature is below the above-described range, the resistance to wear occurring due to high-hardness dust particles included in the flue gas may not sufficiently increase, whereas if the firing temperature is above the above-described range, the denitration performance may seriously degrade. By controlling the firing temperature within the range of 510° C. to 550° C., the wear resistance can be sufficiently increased while maintaining the denitration performance at the same time.

The denitration catalyst production method of the present invention can include a vanadium sulfate carrying process of immersing the honeycomb molded body into an aqueous solution of vanadium sulfate, which is performed before the magnesium sulfate carrying process. By performing this process, degradation of the denitration performance can be prevented while increasing the wear resistance at the same time. The vanadium sulfate has a function as an active ingredient which promotes denitration reactions. If the amount of the carried vanadium nitrate is small, degradation of the denitration performance may not be prevented in some cases. In contrast, if the amount of the vanadium nitrate is excessively increased, its effect would not increase in proportion to the excessively increased amount. By carrying 0.3% by mass to 1% by mass of vanadium sulfate on the honeycomb molded body, degradation of the denitration performance can be effectively prevented. Even if the concentration of the aqueous solution of vanadium sulfate used for the immersion is low, 0.3% by mass to 1% by mass of vanadium sulfate can be carried on the honeycomb molded body by repeating the immersion of the honeycomb molded body and drying of the immersed honeycomb molded body. However, if an aqueous solution of vanadium sulfate in which the concentration of vanadium sulfate is 1.5% by mass to 5.2% by mass is used, then 0.3% by mass to 1% by mass of vanadium sulfate can be carried on the honeycomb molded body by immersing the honeycomb molded body into the aqueous solution of vanadium sulfate once.

The denitration catalyst production method of the present invention can include a carrying process of immersing the honeycomb molded body into a mixed solution of an aqueous solution of magnesium sulfate and an aqueous solution of vanadium sulfate to carry magnesium sulfate and vanadium sulfate on the honeycomb molded body, instead of the magnesium sulfate carrying process. By performing this process, degradation of the denitration performance can be prevented while increasing the wear resistance at the same time.

It is preferable that the temperature of the mixed solution of the aqueous solution of magnesium sulfate and the aqueous solution of vanadium sulfate be 30° C. to 70° C. By controlling the temperature within this range, not only magnesium sulfate but also vanadium sulfate can be readily impregnated into the honeycomb molded body, and the magnesium sulfate and the vanadium sulfate can be efficiently carried on the honeycomb molded body. If an aqueous solution of magnesium sulfate in which the concentration of magnesium sulfate is 15% by mass to 36% by mass is used and if an aqueous solution of vanadium sulfate in which the concentration of vanadium sulfate is 1.5% by mass to 5.2% by mass is used, and if a mixed solution of them is used for the immersion of the honeycomb molded body, 6% by mass to 22% by mass of magnesium sulfate and 0.3% by mass to 1% by mass of vanadium sulfate can be carried on the honeycomb molded body by immersing the honeycomb molded body into the mixed solution once or twice.

EXAMPLES

The present invention will be more specifically described below with reference to Examples and Comparative Examples. However, the present invention is not limited by the following Examples by any means.

[Production of Honeycomb Molded Body]

Metatitanic acid obtained by a titanium oxide production process performed by the sulfuric acid method was neutralized, and then the neutralized metatitanic acid was filtered and washed with water to obtain cake-like metatitanic acid. 8 kg of 67.5% nitric acid was added to the metatitanic acid (820 kg in terms of titanium dioxide), the metatitanic acid was partially deflocculated, and then, the obtained sol solution was evaporated, dried, and further fired at 500° C. for 3 hours. Then the obtained product was cooled and pulverized, and the granularity was then adjusted to obtain a powder of titanium dioxide.

300 L of an aqueous solution in which 5.2 kg of vanadium pentoxide and 112 kg of ammonium paratungstate were dissolved, 50 kg of polyvinyl alcohol, and 100 kg of silicone carbide fiber (fiber diameter: 11 μm, fiber length: 3 mm, a product of Nippon Carbon Co., Ltd.) were added to 800 kg of the powder of titanium dioxide together with about 100 L of water, and then the mixture was kneaded by using a kneader.

Subsequently, the kneaded product was molded by extrusion molding into a honeycomb molded body by using a vacuum extrusion molding machine with a screw having honeycomb extrusion nozzles. The honeycomb molded body was air-dried for a sufficient length of time, and then further dried by forced-air drying at 100° C. for 5 hours. Then the honeycomb molded body was uniformly cut at both axial ends, and then was fired in an electric kiln at 500° C. for 5 hours to obtain a honeycomb molded body I with external diameter of 150 mm×150 mm, axial length of 800 mm, cell pitch of 7.4 mm, and inner wall thickness of 1.15 mm.

Production of Denitration Catalyst

Example 1

A crystal of magnesium sulfate heptahydrate was dissolved in hot water to prepare 26% by mass of a 60° C. aqueous solution of magnesium sulfate, and the honeycomb molded body I was immersed in the aqueous solution of magnesium sulfate for 1 minute, and thereby, magnesium sulfate was carried on the honeycomb molded body so that the content of magnesium sulfate in a resulting denitration catalyst would increase by 12% by mass. The honeycomb molded body was taken out from the aqueous solution of magnesium sulfate, then air was blown onto the honeycomb molded body to blow off the aqueous solution of magnesium sulfate that had excessively adhered to the honeycomb molded body, the honeycomb molded body was dried at 110° C. for more than 4 hours, and then was fired in an electric kiln at 550° C. for 3 hours to obtain a denitration catalyst.

Comparative Example 1

A honeycomb molded body I carrying no magnesium sulfate and having not been treated was used as a denitration catalyst.

Comparative Example 2

The processes were carried out under the same conditions as those in Example 1 except that the firing temperature in the firing process was changed to 500° C. to obtain a denitration catalyst.

Comparative Example 3

The honeycomb molded body I was immersed in 26% by mass aqueous solution of magnesium sulfate at 60° C., then an operation for blowing air onto the honeycomb molded body I was repeated twice, and magnesium sulfate was carried on the honeycomb molded body so that the content of magnesium sulfate in a resulting denitration catalyst would be 23% by mass. The firing temperature in the firing process was 500° C. The processes were carried out under conditions similar to those in Example 1 except for the above-described changes to obtain a denitration catalyst.

Comparative Example 4

Under conditions similar to those in Comparative Example 3, except that the firing temperature in the firing process was 550° C., the processes were carried out to obtain a denitration catalyst.

Comparative Example 5

Under conditions similar to those in Example 1, except that the firing temperature in the firing process was 650° C., the processes were carried out to obtain a denitration catalyst.

Production of Denitration Catalyst

Example 2

The honeycomb molded body I was immersed in a 15% by mass aqueous solution of magnesium sulfate at 60° C. for 1 minute, and thereby magnesium sulfate was carried on the honeycomb molded body so that the content of magnesium sulfate in a resulting denitration catalyst would increase by 7% by mass. The processes were carried out under conditions similar to those in Example 1 except for the above-described change to obtain a denitration catalyst.

Example 3

The honeycomb molded body I was immersed in a 19% by mass aqueous solution of magnesium sulfate at 60° C. for 1 minute, and thereby magnesium sulfate was carried on the honeycomb molded body so that the content of magnesium sulfate in a resulting denitration catalyst would increase by 9% by mass. The processes were carried out under conditions similar to those in Example 1 except for the above-described change to obtain a denitration catalyst.

Example 4

The honeycomb molded body I was immersed in a 26% by mass aqueous solution of magnesium sulfate at 60° C. for 1 minute, and thereby magnesium sulfate was carried on the honeycomb molded body so that the content of magnesium sulfate in a resulting denitration catalyst would increase by 14.5% by mass. The processes were carried out under conditions similar to those in Example 1 except for the above-described change to obtain a denitration catalyst.

Example 5

The honeycomb molded body I was immersed in a 25% by mass aqueous solution of magnesium sulfate at 60° C. for 1 minute, and then the honeycomb molded body was taken out to blow air onto it to blow off the excess adhered aqueous solution of magnesium sulfate. Then the honeycomb molded body I was immersed in an aqueous solution of magnesium sulfate at 60° C. in which the content of magnesium sulfate had increased by 25% by mass, then the honeycomb molded body was taken out dried by forced air, and then further dried at 110° C. for 3 hours. As described above, the honeycomb molded body was immersed in the aqueous solution of magnesium sulfate twice, and thereby magnesium sulfate was carried on the honeycomb molded body so that the content of magnesium sulfate in a resulting denitration catalyst would increase by 22% by mass. The processes were carried out under conditions similar to those in Example 1 except for the above-described changes to obtain a denitration catalyst.

[Evaluation of Wear Resistance]

The denitration catalysts of Examples 1 to 5 and Comparative Example 1 were respectively cut into pieces with a section of 45 mm×45 mm and length of 100 mm, and the obtained pieces were charged into a catalyst reactor. Silica sand (average grain size: 40 μm), i.e., a wear material, was assumed as high-hardness dust, a gas including the silica sand at a concentration of 70 g/m$^3$ was allowed to flow through the denitration catalyst at 20° C. for 30 minutes under atmospheric pressure at the flow rate of 40 m/sec per each section of the denitration catalyst, and the wear rate was calculated based on the amount of wear in the denitration catalyst that had occurred during the time in which the gas was allowed to flow. The wear rate is given by the following expression (1). In the following expression (1), $W_0$ is a mass of the denitration catalyst before the wear test, and W is a mass of the denitration catalyst after the wear test. The results are shown in FIG. 1.

$$[(W_0-W)/W_0]\times 100(\%)] \qquad \text{[Expression 1]}$$

Figure 1:
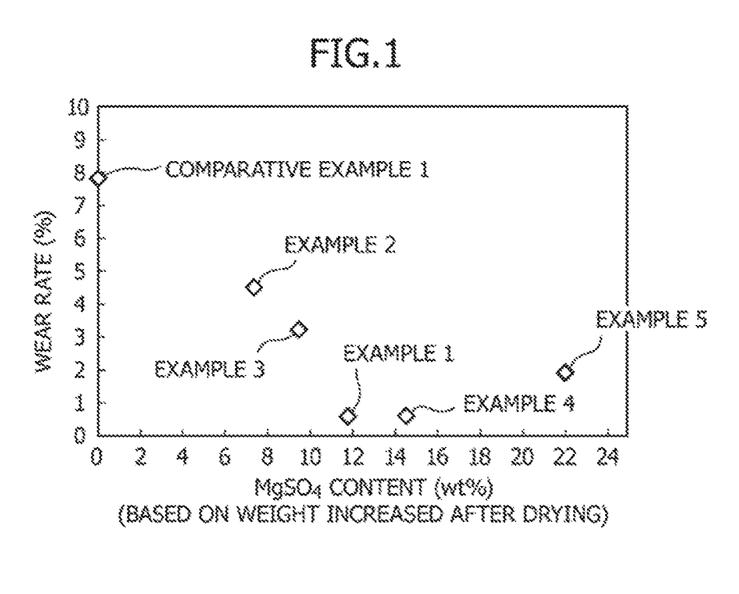
FIG. 1 is a view which illustrates a relationship between the content of magnesium sulfate and the wear resistance.

Referring to FIG. 1, the wear rate of the denitration catalysts of Examples 1 to 5 was 5% by mass or less, respectively, and compared with the result of the test in Comparative Example 1 in which the wear rate of the denitration catalyst was 8% by mass, it was obvious that the wear resistance had improved.

From the results shown in FIG. 1, it was found that the wear resistance of the denitration catalyst could be improved by carrying magnesium sulfate on the honeycomb molded body so that the content of magnesium sulfate would increase by 7% by mass to 22% by mass.

Production of Denitration Catalyst

Example 6

The processes were carried out under the same conditions as those in Example 1 except that the firing temperature in the firing process was changed to 510° C. to obtain a denitration catalyst.

Example 7

The processes were carried out under the same conditions as those in Example 1, except that the firing temperature in the firing process was changed to 530° C. to obtain a denitration catalyst.

Comparative Example 6

The processes were carried out under the same conditions as those in Example 1, except that the firing temperature in the firing process was changed to 650° C. to obtain a denitration catalyst.

The wear resistance was evaluated for the denitration catalysts of Examples 6 and 7 and Comparative Example 6.

Figure 2:
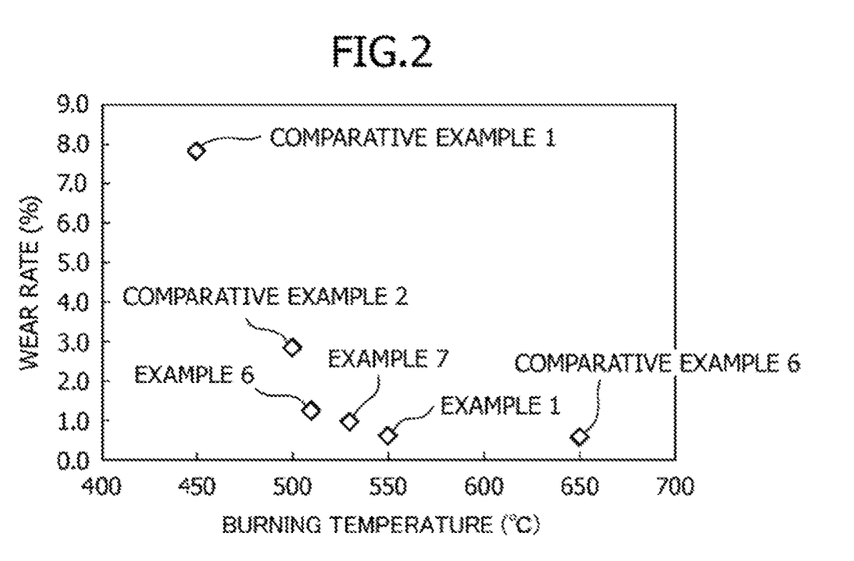
FIG. 2 is a view which illustrates a relationship between firing temperatures and the wear resistance in a denitration catalyst containing 12% by mass of magnesium sulfate.

The results of evaluation of the wear resistance are shown in FIG. 2 together with the results of Example 1 and Comparative Examples 1 and 2.

Referring to FIG. 2, when the firing temperature was 500° C. or more, the wear resistance improved, and particularly when the firing temperature was 510° C. or more, the wear rate was as low as about 1%, which showed excellent results.

When the firing temperature was 650° C. (Comparative Example 6), the constant ratio of the reaction rate degraded, and accordingly, the result was such that when the firing temperature became high, the denitration performance of the denitration catalyst was affected.

Figure 3:
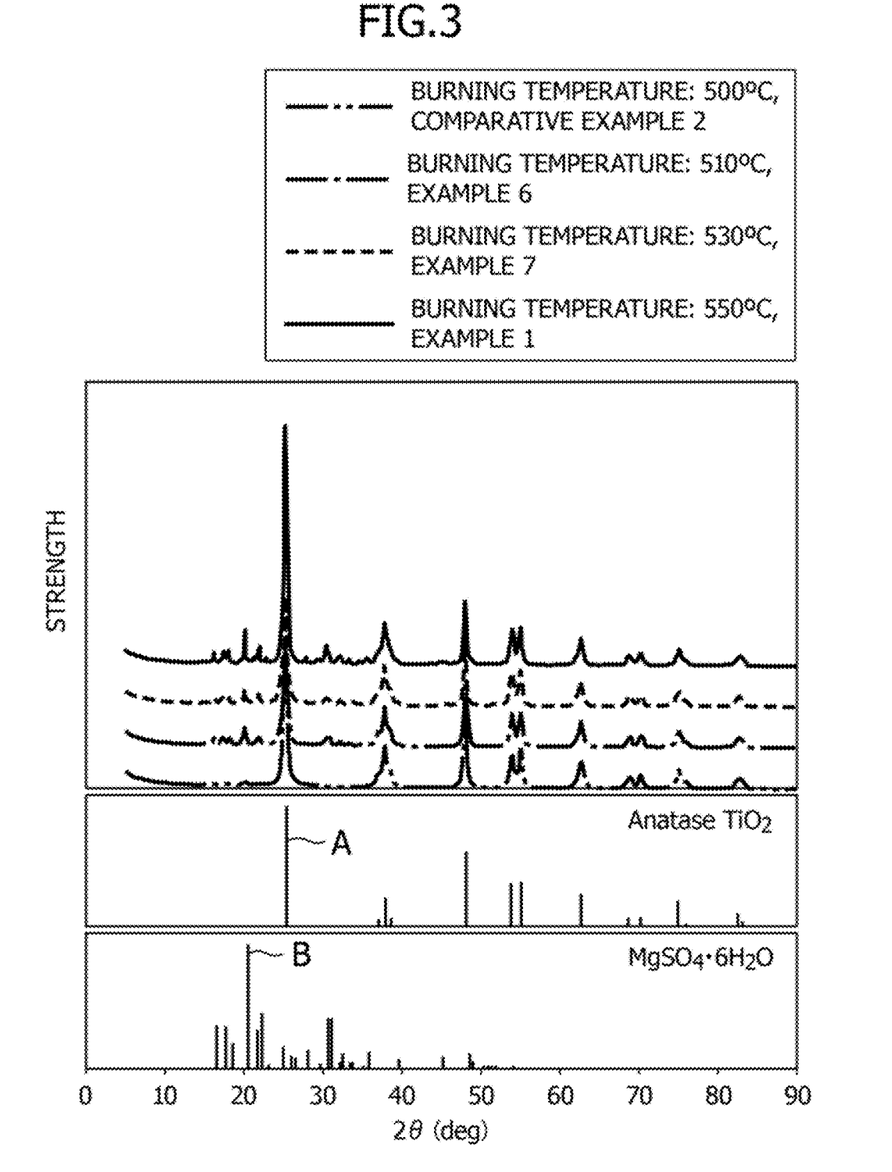
FIG. 3 is a view which illustrates results of crystallography performed on a denitration catalyst by an X-ray diffraction method.

FIG. 3 illustrates results of crystallography performed on the denitration catalysts of Example 1 (firing temperature: 550° C.), Example 6 (firing temperature: 510° C.), Example 7 (firing temperature: 530° C.), and Comparative Example 2 (firing temperature: 500° C.) performed by the X-ray diffraction method. From among the obtained peaks, peaks originating from crystals of anatase type titanium oxide and magnesium sulfate were observed.

Figure 4:
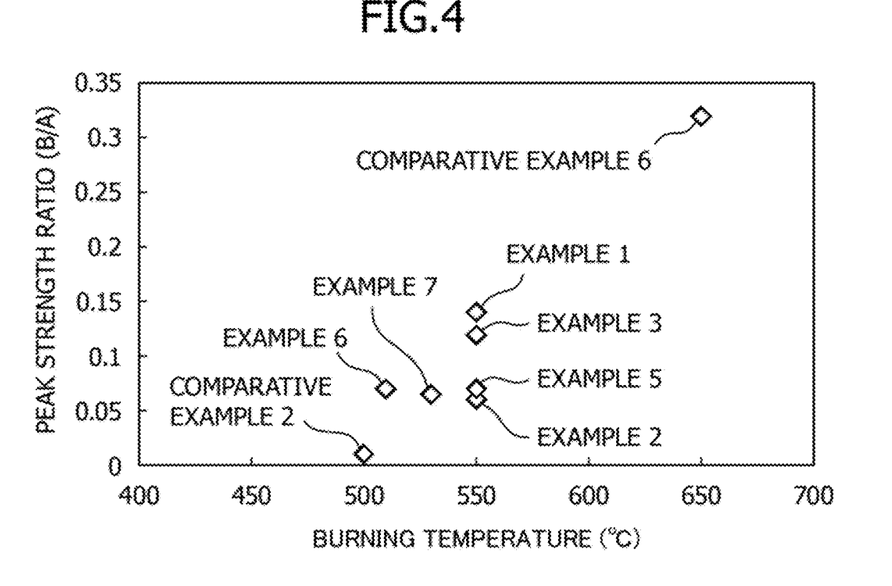
FIG. 4 is a view which illustrates a peak strength ratio in a denitration catalyst between a first peak A for a peak originating from anatase type titanium oxide and a first peak B for a peak originating from the magnesium sulfate observed by an X-ray diffraction method.

FIG. 4 illustrates peak strength ratios (B/A) between first peaks A for anatase type titanium oxide and first peaks B for magnesium sulfate obtained by the X-ray diffraction method performed on the denitration catalysts of Example 1 (firing temperature: 550° C.), Example 2 (firing temperature: 550° C.), Example 3 (firing temperature: 550° C.), Example 5 (firing temperature: 550° C.), Example 6 (firing temperature: 510° C.), Example 7 (firing temperature: 530° C.), Comparison example 2 (firing temperature: 500° C.), and Comparative Example 6 (firing temperature: 650° C.). In Examples 1 to 3 and Examples 5 to 7, the peak strength ratio was in the range of 0.05 to 0.15.

From the results illustrated in FIGS. 2 to 4, it was found that a denitration catalyst with improved wear resistance could be obtained while maintaining the denitration performance at the same time if the firing temperature was in the range of 510° C. to 550° C. The peak strength ratios (B/A) of such denitration catalysts were in the range of 0.05 to 0.15.

Production of Denitration Catalyst

Example 8

A reagent was prepared to obtain 3.4% by mass of an aqueous solution of vanadium sulfate and 26% by mass of an aqueous solution of magnesium sulfate, and a 60° C. mixed solution of these solutions was prepared. The honeycomb molded body I was immersed in the mixed solution for 1 minute, then the honeycomb molded body was taken out, air was blown onto the honeycomb molded body to blow off the excessively adhered aqueous solution of vanadium sulfate and aqueous solution of magnesium sulfate, and then the honeycomb molded body was dried at 110° C. for 3 hours. By performing the above-described immersion process, magnesium sulfate was carried on the honeycomb molded body so that the content of vanadium sulfate in a resulting denitration catalyst would increase by 0.66% by mass in terms of vanadium pentoxide and the content of magnesium sulfate would increase by 12% by mass. Then the honeycomb molded body was fired in an electric kiln at 550° C. for 3 hours to obtain a denitration catalyst.

Example 9

First, the honeycomb molded body I was immersed in a 34% by mass of an aqueous solution of vanadium sulfate at 20° C., and then the honeycomb molded body was taken out and air was blown onto the honeycomb molded body to blow off the excessively adhered aqueous solution of vanadium sulfate. Then 26% by mass of an aqueous solution of magnesium sulfate at 60° C. was prepared, the honeycomb molded body I was immersed in this solution for 1 minute, the honeycomb molded body was taken out from the aqueous solution of magnesium sulfate, air was blown onto the honeycomb molded body to blow off the excessively adhered aqueous solution of magnesium sulfate, and the honeycomb molded body was dried at 110° C. for 3 hours. By performing the above-described immersion process, magnesium sulfate was carried on the honeycomb molded body so that the content of vanadium sulfate in a resulting denitration catalyst would increase by 0.66% by mass in terms of vanadium pentoxide and the content of magnesium sulfate would increase by 12% by mass. Then the honeycomb molded body was fired in an electric kiln at 550° C. for 3 hours to obtain a denitration catalyst.

Comparative Example 7

First, the honeycomb molded body I was immersed in a 26% by mass aqueous solution of magnesium sulfate at 60° C., and then the honeycomb molded body was taken out and air was blown onto the honeycomb molded body to blow off the excessively adhered aqueous solution of magnesium sulfate. Then 3.4% by mass of an aqueous solution of vanadium sulfate at 20° C. was prepared, the honeycomb molded body I was immersed in this solution for 1 minute, the honeycomb molded body was taken out from the aqueous solution of vanadium sulfate, air was blown onto the honeycomb molded body to blow off the excessively adhered aqueous solution of vanadium sulfate, and the honeycomb molded body was dried at 110° C. for 3 hours. By performing the above-described immersion process, magnesium sulfate was carried on the honeycomb molded body so that the content of vanadium sulfate in a resulting denitration catalyst would increase by 0.66% by mass in terms of vanadium pentoxide and the content of magnesium sulfate would increase by 12% by mass. Then, the honeycomb molded body was fired in an electric kiln at 550° C. for 3 hours to obtain a denitration catalyst.

The wear resistance and the denitration performance were evaluated for the denitration catalysts of Examples 8 and 9 and Comparative Example 7. Results of Example 1 and Comparative Example 1 and results of evaluation of the wear resistance are shown in FIG. 5.

Figure 5:
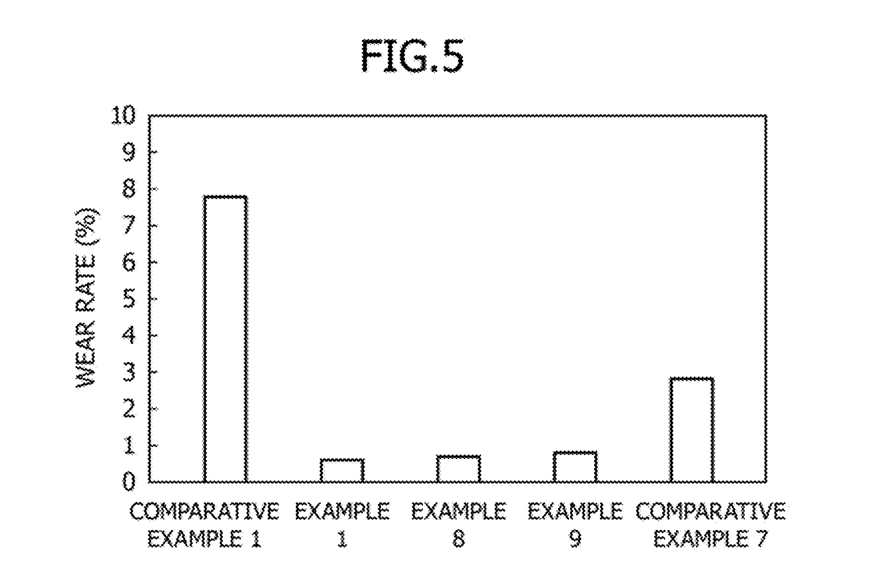
FIG. 5 is a view which illustrates the wear resistance of a denitration catalyst containing vanadium sulfate.

Referring to FIG. 5, the amount of wear in the denitration catalysts of Examples 8 and 9 was slightly increased from the wear amount in the denitration catalyst of Example 1, and the wear resistance was sufficiently excellent. In contrast, the amount of wear in the denitration catalyst of Comparative Example 7 was increased from the wear amount in the denitration catalyst of Example 1 by about three times, and the result showed a poor wear resistance.

From the above results, it was found that the denitration performance could be improved while substantially maintaining the wear resistance by immersing the honeycomb molded body into an aqueous solution of vanadium sulfate prior to immersion of the honeycomb molded body into an aqueous solution of magnesium sulfate (Example 9). In addition, it was also found that the denitration performance could be improved while substantially maintaining the wear resistance also by immersing the honeycomb molded body into a mixed solution in which vanadium sulfate and magnesium sulfate coexist (Example 8). In contrast, it was found that the wear resistance would degrade by immersing the honeycomb molded body into an aqueous solution of magnesium sulfate prior to immersion of the honeycomb molded body into an aqueous solution of vanadium sulfate (Comparative Example 7).

Figure 6:
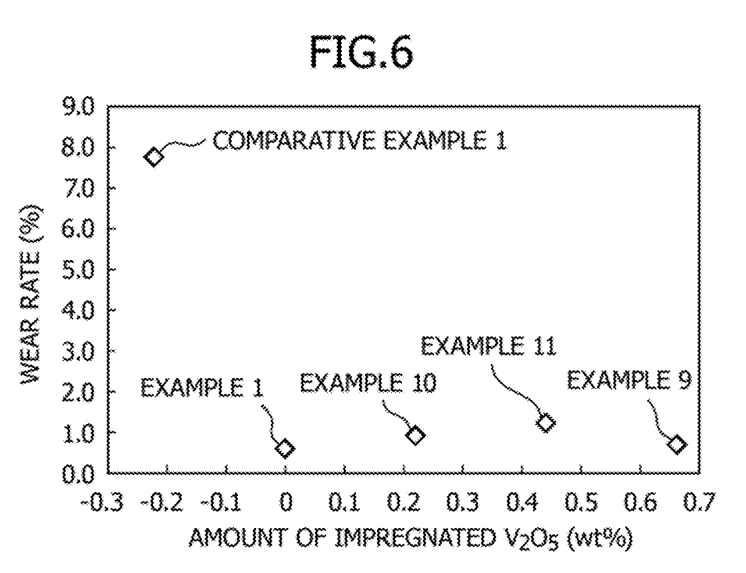
FIG. 6 is a view which illustrates the influence of the content of vanadium sulfate on the wear resistance of a denitration catalyst.

FIG. 6 is a view which illustrates the influence from the content of vanadium sulfate on the wear resistance of the denitration catalyst. The denitration catalysts of Examples 10 and 11 plotted between Examples 1 and 9 were produced by adjusting the content of vanadium sulfate based on the production process of Example 9. From this result, it was found that the amount of wear of the denitration catalyst substantially leveled off even if the content of vanadium sulfate increased and that that the wear resistance would not be affected.

Figure 7A:
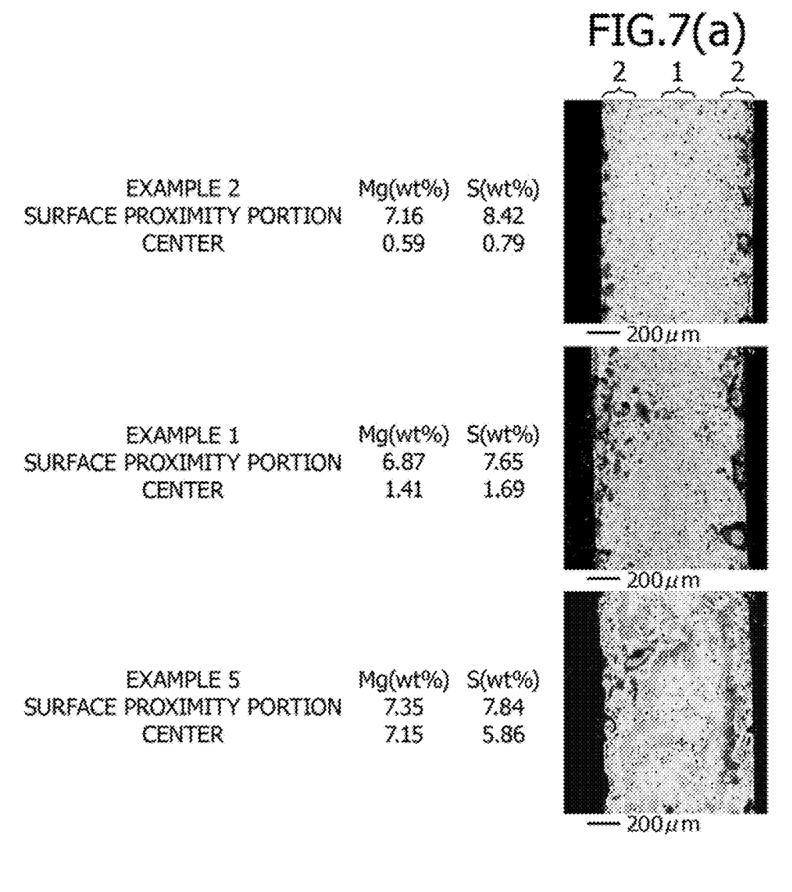
FIG. 7 is a view which illustrates results of measurement of distribution of magnesium and the like in a denitration catalyst performed by electron probe micro analysis (EPMA) measurement and results of calculation of the content of magnesium and the like in the portions close to the surface of the denitration catalyst and in the center thereof.
Figure 7B:
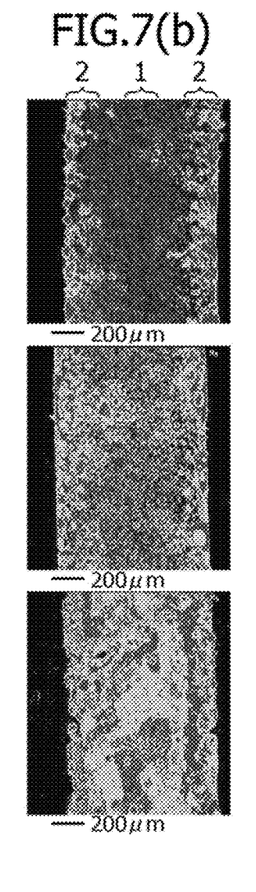
Figure 7C:
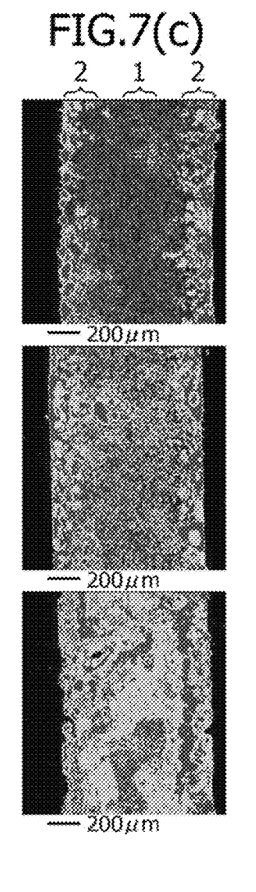

FIG. 7 is a view which illustrates results of distribution of titanium (FIG. 7(a)), magnesium (FIG. 7(b)), and sulfur (FIG. 7(c)) in the denitration catalysts of Example 1 (content of magnesium sulfate: increased by 12% by mass), Example 2 (content of magnesium sulfate: increased by 7% by mass), and Example 5 (content of magnesium sulfate: increased by 22% by mass) measured by electron probe micro analysis (EPMA) measurement and results of calculation of the content of magnesium and sulfur in the portions close to the surface of the denitration catalyst and in the center of the catalyst. A catalyst center 1 was a portion with a width of ±100 μm from the center of the inside of the wall of the denitration catalyst. A surface proximity portion 2 was constituted by a wall inside the catalyst that forms a through hole in the direction of flow of the flue gas with a depth of 200 μm from the surface of the wall that contacts the flue gas to the inside of the wall.

In the photographs shown in FIG. 7 obtained by EPMA measurement, regions in which more elements to be measured were present than the other regions are shown whiter than the other regions. In FIG. 7(a), almost all the regions of the denitration catalyst are in white. In FIGS. 7(b) and 7(c), in the photographs of Examples 1 and 2, the surface proximity portions are whiter than the catalyst center, while in the photographs of Example 5, almost all the regions of the denitration catalyst are in white. From these results, as shown in FIGS. 7(b) and 7(c), it was clarified that after the denitration catalyst was impregnated in an aqueous solution of magnesium sulfate once, magnesium and sulfur were distributed on the surface of the denitration catalyst and portions close to the surface (Examples 1 and 2). It was found that in the denitration catalyst impregnated in an aqueous solution of magnesium sulfate twice (Example 5), as compared with and differently from the case in which the denitration catalyst was impregnated in the solution once, magnesium and sulfur was present on the surface of the denitration catalyst and the portions close to the surface and even penetrated through the inside thereof (FIGS. 7(b) and 7(c)). In addition, referring to FIG. 7(a), it can be known that titanium was distributed uniformly on the denitration catalyst regardless of the number of times of impregnation of the denitration catalyst in the aqueous solution of magnesium sulfate.

In all of the denitration catalysts of Examples 1, 2, and 5, the content of magnesium and sulfur in the portions close to the surface of the denitration catalyst tended to be more than the content of magnesium and sulfur in the center of the denitration catalyst, and the content of magnesium in the portions close to the surface was 6.87% by mass to 7.35% by mass and the content of sulfur in the portions close to the surface was 7.65% by mass to 8.42% by mass (FIG. 7).

Figure 8:
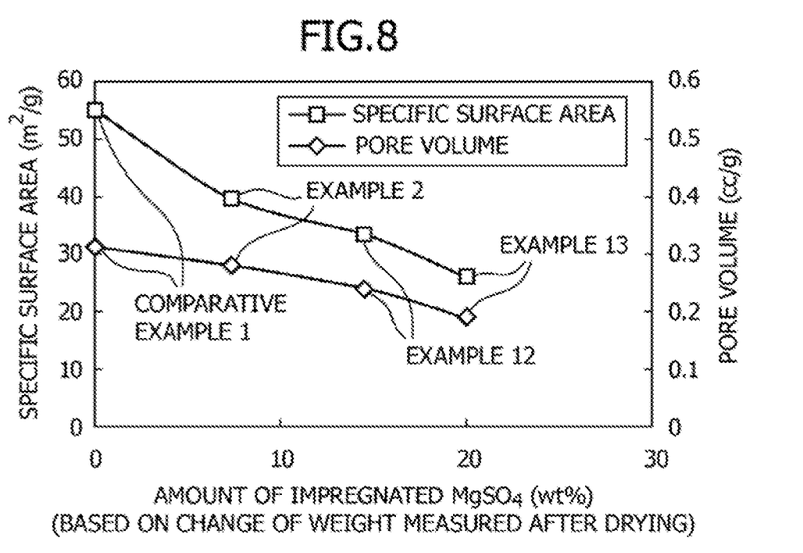
FIG. 8 is a view which illustrates the influence of the content of vanadium sulfate on the specific surface area and the pore volume of a denitration catalyst.

FIG. 8 is a view which illustrates the influence of the content of magnesium sulfate on the specific surface area and the pore volume of a denitration catalyst. The specific surface area was measured by the BET method, and the pore volume was measured by the mercury porosimetry. The specific surface area and the pore volume of the denitration catalysts tended to reduce as the content of magnesium sulfate increased. When the content of magnesium sulfate was increased by 6% by mass (Example 2) to 20% by mass (Example 13), the specific surface area of the denitration catalyst was 27 $m^2/g$ to 55 $m^2/g$ and the pore volume was 0.22 cc/g to 0.30 cc/g.

Figure 9:
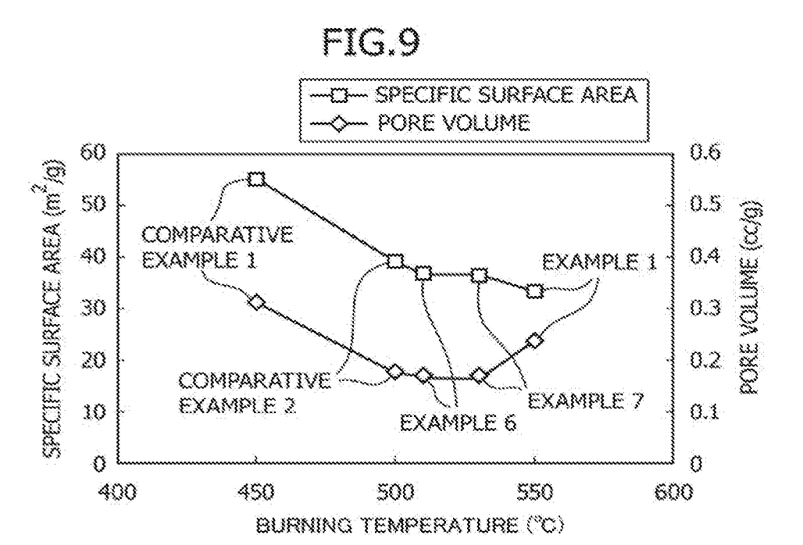
FIG. 9 is a view which illustrates the influence of the firing temperature on the specific surface area and the pore volume of a denitration catalyst.

FIG. 9 is a view which illustrates the influence of the firing temperature on the specific surface area and the pore volume of a denitration catalyst. The specific surface area of the denitration catalyst tended to be smaller as the firing temperature was increased more. The pore volume of the denitration catalyst tended to be smaller as the firing temperature was increased more in the temperature range of up to 530° C., whereas it tended to be larger as the firing temperature was increased more beyond 530° C. In the range of firing temperature between 510° C. to 550° C., the specific surface area of the denitration catalyst was 33 $m^2/g$ to 38 $m^2/g$, and the pore volume was 0.17 cc/g to 0.24 cc/g.

INDUSTRIAL APPLICABILITY

According to the denitration catalyst of the present invention and the production method therefor, a denitration catalyst with an improved wear resistance can be provided and nitrogen oxides included in flue gases can be stably reduced and removed for a long period of time, and therefore, the present invention is industrially useful.

REFERENCE SIGNS LIST

A First peak for anatase type titanium oxide observed by the X-ray diffraction method
B First peak for magnesium sulfate observed by the X-ray diffraction method
1 Catalyst center
2 Surface proximity portion

The invention claimed is:
1. A denitration catalyst which comprises:
magnesium sulfate carried on a honeycomb molded body, wherein
the honeycomb molded body comprises titanium oxide, vanadium pentoxide and tungsten oxide,
a content of magnesium in portions close to a surface of the denitration catalyst measured by electron probe micro analysis (EPMA) is more than a content of magnesium in a center of the denitration catalyst,
the portions close to the surface of the denitration catalyst are constituted by walls arranged inside the catalyst that form through holes formed in the direction of flow of a flue gas, which have a depth of 200 μm from the surface of the walls on which the walls contact the flue gas toward the inside of the walls,
the center of the catalyst is a portion which has a width of ±100 μm from the center of the inside of the wall of the denitration catalyst,
a content of the magnesium sulfate carried on the honeycomb molded body is 7% by mass to 14.5% by mass of the honeycomb molded body,
a pore volume of the denitration catalyst is 0.17 cc/g to 0.40 cc/g, and a specific surface area of the denitration catalyst is 33 m²/g to 100 m²/g.

2. The denitration catalyst according to claim 1, wherein vanadium sulfate is further carried on the honeycomb molded body.

3. A method of producing a denitration catalyst comprising:
- a step of providing a honeycomb molded body which comprises titanium oxide, vanadium pentoxide and tungsten oxide,
- a vanadium sulfate carrying step of carrying vanadium sulfate on the honeycomb molded body in a content of 0.3% by mass to 1% by mass of the honeycomb molded body, by immersing the honeycomb molded body in an aqueous solution of the vanadium sulfate, which step is followed by
- a magnesium sulfate carrying step of carrying magnesium sulfate on the honeycomb molded body in a content of 7% by mass to 14.5% by mass of the honeycomb molded body, by immersing the honeycomb molded body in a 30° C. to 70° C. aqueous solution of magnesium sulfate; and
- a firing step of firing the honeycomb molded body at 510° C. to 550° C., which step is performed after the magnesium sulfate carrying step.

4. A method of producing a denitration catalyst at least comprising the steps of:
- a carrying step of carrying magnesium sulfate increased by 7% by mass to 14.5% by mass and 0.3% by mass to 1% by mass of vanadium sulfate on a honeycomb molded body which at least includes titanium oxide and vanadium pentoxide by immersing the honeycomb molded body in a 30° C. to 70° C. mixed solution of an aqueous solution of magnesium sulfate and an aqueous solution of vanadium sulfate; and
- a firing step of firing the honeycomb molded body at 510° C. to 550° C., which is performed after the carrying step.

* * * * *